Nov. 20, 1951 R. A. MANK 2,575,966
COMPOSITE TIRE CHAIN FASTENER
Filed June 19, 1948

INVENTOR.
Raymond A. Mank
BY William B. Jaspert
attorney.

Patented Nov. 20, 1951

2,575,966

UNITED STATES PATENT OFFICE 2,575,966

COMPOSITE TIRE CHAIN FASTENER

Raymond A. Mank, Pittsburgh, Pa.

Application June 19, 1948, Serial No. 34,109

2 Claims. (Cl. 152—242)

This invention relates to new and useful improvements in composite tire chains of the type disclosed in my Patent No. 2,444,453 granted July 6, 1948, and more particularly to fastening means for securing the ends of the side rims of said chains.

In the patent referred to above, I have disclosed a composite tire chain in which the rims to which the cross links are joined are constituted of reinforced rubber, and are self-sustaining so as to constitute circular bands which may be slipped over the tires without drooping as in the conventional type of tire chain.

In accordance with the present invention means are provided for attaching the side rim members to facilitate mounting of the composite chain structures on the tires.

Figure 1:
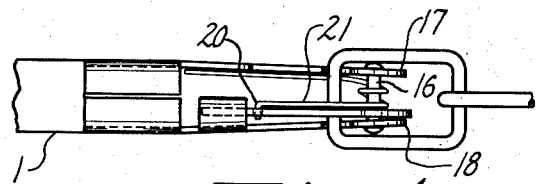
Figure 2:
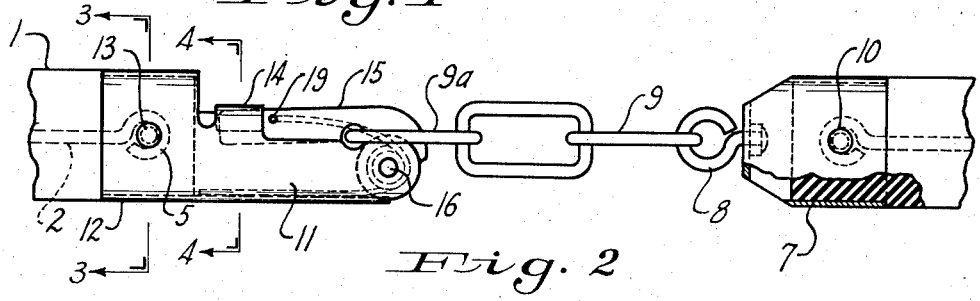
Figure 3:
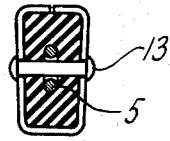
Figure 4:
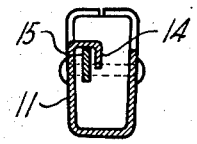
Figure 5:
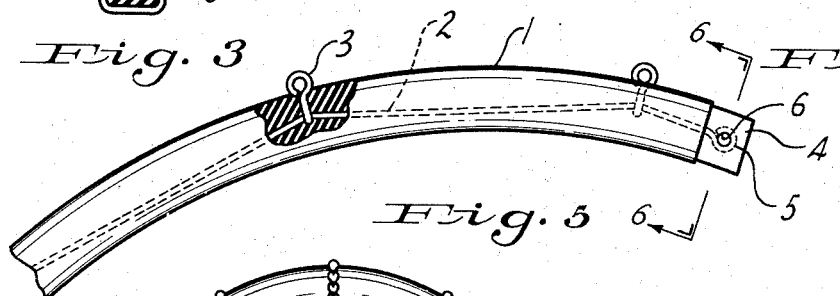
Figure 6:
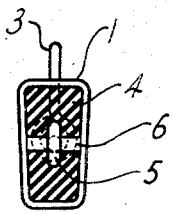

The invention will become more apparent from a consideration of the accompanying drawing, constituting a part hereof, in which like reference characters designate like parts, and in which Fig. 1 is a top plan view of an end bracket mounted on the side rim of a tire chain;

Fig. 2 a side elevational view of the end brackets on both ends of the side rim connected by links and fastened in locked position;

Fig. 3 a cross sectional view taken along the line 3—3, Fig. 2;

Fig. 4 a cross sectional view taken along the line 4—4, Fig. 2;

Fig. 5 a side elevational view of a portion of a reinforced rubber side rim for tire chains having cross link connections;

Fig. 6 a cross sectional view taken along the line 6—6, Fig. 5; and

Figure 7:
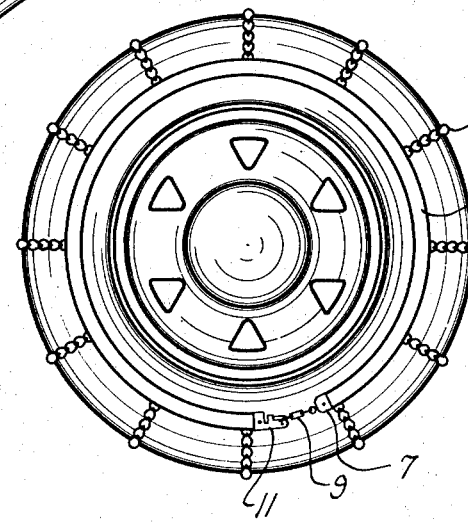

Fig. 7 a side elevational view of an assembled composite tire chain structure including the fastening means of this invention.

With reference to the several figures of the drawing, the numeral 1 designates a rubber side rim of which there are two for each set of chains, the rim being a complete annulus as shown in Fig. 7 except for the end brackets and connecting links as will be hereinafter explained. Embedded in the rim is a reinforcing member, such as a cable 2, to which are attached the cross link anchorages 3. As shown in Fig. 5, the ends of the side rims 1 are of reduced cross section designated at 4 in which the end of the reinforcing member 2 is looped as shown at 5 for receiving a rivet through a perforation or opening 6 extending transversely of the member 4, the reduced section being also shown in Fig. 6 of the drawing. The reduced section 4 may be the same at both ends of the rim 1, and one end is provided with a rectangular shaped ferrule 7 having a swivel eye 8 mounted therein for connecting a short chain of links 9, there being three shown in Fig. 2 of the drawing. The ferrule 7 is secured to the reduced end 4 of the side rim by a rivet 10 that extends through the perforation 6, Figs. 5 and 6, the rivet passing through the looped eyelet 5 of the reinforcing strand 2. The other end of the side rim 1 is provided with a clamping bracket, generally designated by the numeral 11, having a ferruled end 12 fitting the reduced end 4 secured by a rivet 13 extending through the eyelet end 5 of the reinforcing element 2 of the side rim.

The clamping bracket, as shown in cross section in Fig. 4, has a bent-over lip 14 forming a U-shaped channel for receiving the clamping bar or lever 15 which is pivotally mounted on a rivet 16 extending through the ends 17 and 18 of the bracket 11. The clamping lever 15 is provided with a perforation 19 for receiving the bent-over end 20 of a spring 21 which is wrapped around the rivet 16, the spring normally biasing lever 15 in the open position.

To fasten the ends of the side rims 1 in the manner shown in Fig. 7, lever 15 is slipped through the end link 9a of the chain and pulled downward below the lip 14 of the bracket 11 and slipped into the position shown in Fig. 4 of the drawing, from which position it is locked against displacement in the regular usage of the tire chain. The chain, as shown in Fig. 7, is provided with the usual cross links 22 which are fastened to the eyelets 3, Fig. 3.

In mounting the composite rubber tire chain in the manner shown in Fig. 7, the clamping ends are open and the side rims with the connected links are slipped over the tire by merely passing the rear side rim over the outside tire casing. The tire or vehicle on which it is mounted may then be moved until the open ends are accessible for fastening at either the front or rear of the wheel, as is well known to tire chain users.

The end links 9a are then slipped over the levers 15 and they are pressed down and latched in the lip 14 of the clamping bracket 11.

Although one embodiment of the invention has been herein illustrated and described, it will be evident to those skilled in the art that various modifications may be made in the details of construction without departing from the principles herein set forth.

I claim:

1. In a composite rubber and steel tire chain structure having a pair of side rims interconnected by cross chains, a fastening means for each side rim comprising metal ferrules of substantially the shape of the cross sectional area of the side rim and connecting linkage, the links having a swivel mount connection with one of the ferrules and having a connection by a clamping lever with the other, said ferrules being fastened to reinforcing members embedded in the ends of said side rim.

2. In a composite rubber and steel tire chain structure having a pair of side rims interconnected by cross chains, reinforcing material provided in each of said rims adjacent the ends thereof, the ends of the rims being of reduced cross section for receiving complementary shaped end ferrules, means for fastening the ferrules to reinforcing material provided in the reduced ends of said side rims and connecting means for the ends of the ferrules swivelly mounted at one end to one of said ferrules and having locking engagement with a clamp attached to the ferrule on the other end of said rims.

RAYMOND A. MANK.

REFERENCES CITED

The following references are of record in the file of this patent:

UNITED STATES PATENTS

| Number | Name | Date |
|---|---|---|
| 182,936 | Knuth | Oct. 3, 1876 |
| 1,025,159 | Raymond | May 7, 1912 |
| 1,236,671 | Carroll | Aug. 14, 1917 |
| 2,444,573 | Mank | July 6, 1948 |

FOREIGN PATENTS

| Number | Country | Date |
|---|---|---|
| 53,164 | Switzerland | 1911 |
| 453,451 | Germany | 1927 |